United States Patent
Ono

(10) Patent No.: US 7,783,071 B2
(45) Date of Patent: Aug. 24, 2010

(54) IMAGING APPARATUS HAVING A SLOT IN WHICH AN IMAGE VERIFICATION APPARATUS IS INSERTED

(75) Inventor: Satoshi Ono, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 11/023,220

(22) Filed: Dec. 22, 2004

(65) Prior Publication Data
US 2005/0141749 A1 Jun. 30, 2005

(30) Foreign Application Priority Data
Dec. 26, 2003 (JP) ............... 2003-435127
Dec. 9, 2004 (JP) ............... 2004-357314

(51) Int. Cl.
G06K 9/00 (2006.01)
H04N 5/225 (2006.01)
H04N 7/167 (2006.01)

(52) U.S. Cl. ............ 382/100; 348/207.99; 380/202

(58) Field of Classification Search ............ None
See application file for complete search history.

(56) References Cited

U.S. PATENT DOCUMENTS 6,968,058 B1 11/2005 Kondoh
7,308,577 B2 12/2007 Wakao
2002/0018130 A1* 2/2002 Suemoto et al. ............ 348/231
2002/0060736 A1 5/2002 Wakao
2007/0162756 A1* 7/2007 Fredlund et al. ............ 713/176

FOREIGN PATENT DOCUMENTS

| JP | 11-308564 A | 11/1999 |
| JP | 2001-337600 A | 12/2001 |
| JP | 2002-312725 A | 10/2002 |
| JP | 2003-198543 A | 7/2003 |

* cited by examiner

Primary Examiner—Charles Kim
(74) Attorney, Agent, or Firm—Canon U.S.A., Inc. I.P. Division

(57) ABSTRACT

An imaging apparatus includes an image data generating unit, a verification data generating unit, a first slot, a second slot, a first interface and a second interface. The image data generating unit generates image data. The verification data generating unit generates first verification data used to detect whether the image data is changed. A recording medium is inserted to the first slot.

An image verification apparatus is inserted to the second slot. The first interface unit stores a first image file in the recording medium, the first image file including the image data and the first verification data. The second interface unit that transfers the first image file to the image verification apparatus. The image verification apparatus is capable of detecting, using the image data and the first verification data, whether the image data is changed.

6 Claims, 6 Drawing Sheets

| UNIQUE ID | COMMON INFORMATION Kc | SECRET INFORMATION Ks |
|---|---|---|
| 001 | 0x1111 | 0x2222 |
| 002 | ......... | ......... |
| ......... | ......... | ......... |

IMAGING APPARATUS HAVING A SLOT IN WHICH AN IMAGE VERIFICATION APPARATUS IS INSERTED

BACKGROUND OF THE INVENTION

1. Field of the Invention

The present invention relates to technologies for detecting changes in image data generated by imaging apparatuses, such as digital cameras.

2. Description of the Related Art

In recent years, digital cameras that digitize optical images of objects and store the digitized optical images have become commercially practical. Image data photographed using such digital cameras can be easily captured in personal computers. On the other hand, such image data can be easily changed on personal computers.

Thus, image data photographed using digital cameras has a reliability lower than silver-salt photographs and has low trustworthiness. In recent years, various digital camera systems having a function to add digital signatures to image data photographed using digital cameras have been suggested.

Normally, digital signatures are generated using a public key cryptosystem, such as a Rivest Shamir Adleman (RSA) encryption. Since the public key cryptosystem, such as the RSA encryption, needs exponentiation and remainder operations, it is difficult to perform processing at a high speed, and a processing time hundreds to thousands of times that required for a common key cryptosystem, such as data encryption standard (DES), is required. Thus, it is very difficult for the limited operation resources of known digital cameras to generate digital signatures.

A method for significantly increasing the performance of operation resources of digital cameras so that digital signatures can be easily generated is available. In this method, however, the cost required for digital cameras themselves is significantly increased.

In order to solve the above problems, an image verification system capable of preventing an increase in the cost required for an imaging apparatus, such as a digital camera, and accurately detecting whether or not image data photographed using the imaging apparatus is changed is suggested in Japanese Patent Laid-Open No. 2002-244924 (U.S. publication number 2002/0060736 A1).

In the image verification system suggested in Japanese Patent Laid-Open No. 2002-244924, an image verification apparatus is separated from an imaging apparatus. The image verification apparatus accurately detects whether or not image data generated by the imaging apparatus is changed, and accurately determines whether or not image data in an image file including primary verification data is generated by the imaging apparatus. Also, if the integrity of the image file including the primary verification data is confirmed, the image verification apparatus converts the image file into an image file including secondary verification data (a digital signature).

This image verification system, however, requires the use of an apparatus, such as a personal computer, which is other than the imaging apparatus, as an image verification apparatus. Thus, a large-scale system must be used.

SUMMARY OF THE INVENTION

An object of the present invention is to overcome the above-described drawbacks.

Another object of the present invention is to provide an image verification system capable of being readily used for verifying a change in image data generated by an imaging apparatus, such as a digital camera.

In an aspect of the present invention, an imaging apparatus includes an image data generation unit for generating image data; a verification data generation unit for generating first verification data for detecting a change in the image data; a first connection unit capable of being connected to a recording medium that records both the image data and the first verification data; and a second connection unit capable of being connected to an image verification apparatus that has a function to generate second verification data for detecting a change in the image data.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE PREFERRED EMBODIMENTS

Embodiments of the present invention will be described in detail below with reference to the drawings.

Figure 1:
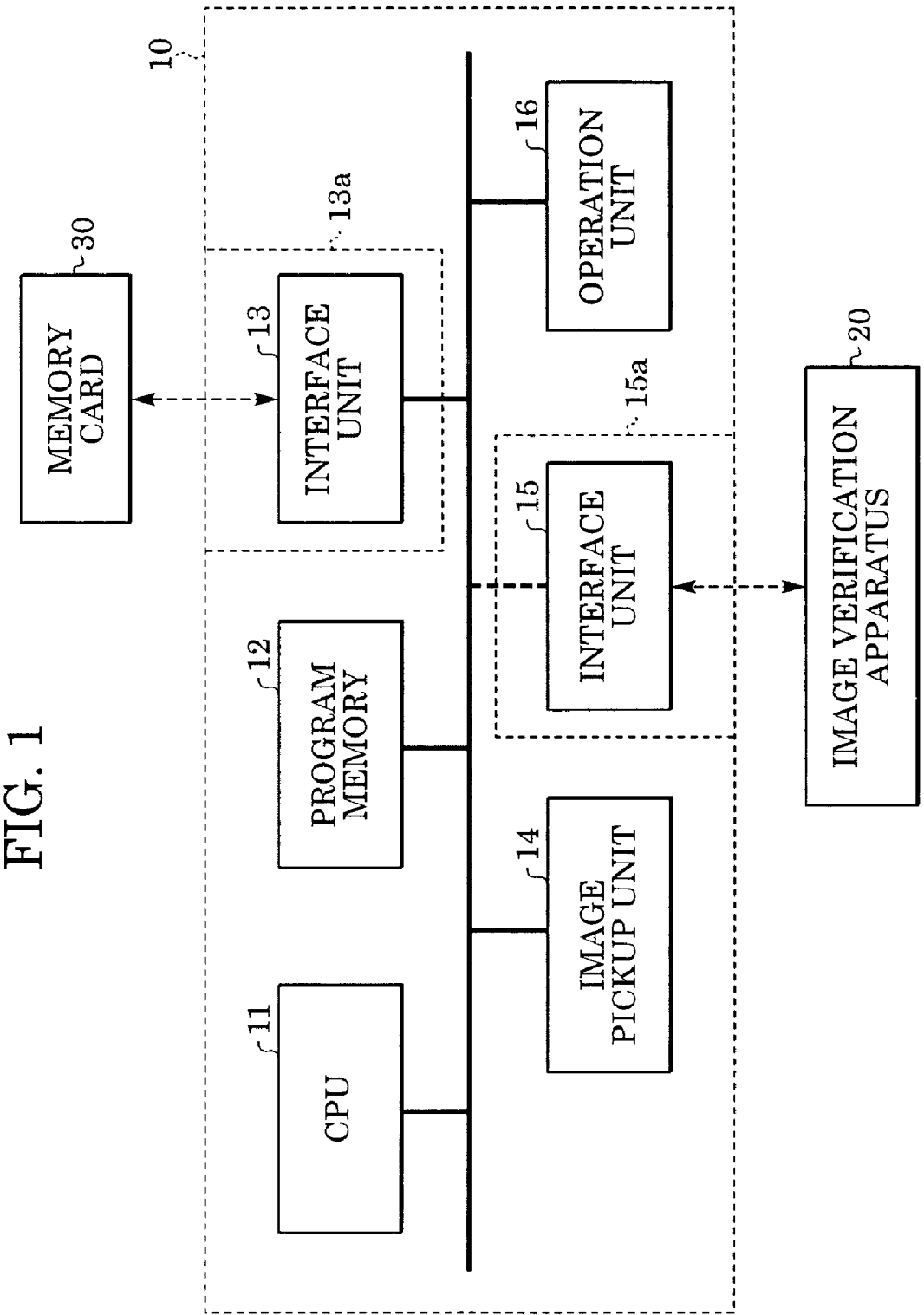
FIG. 1 is a block diagram for explaining the main structure of an imaging apparatus according to an embodiment.

Referring to FIG. 1, an imaging apparatus 10, such as a digital camera, generates image data of an object and primary verification data for verifying the integrity of the image data. The imaging apparatus 10 also generates an image file including the primary verification data.

The imaging apparatus 10 includes first and second slots into which recording media are inserted. A memory card 30, which is an example of a recording medium, is inserted in the first slot. An image verification apparatus 20, which is an example of a recording medium, is inserted in the second slot. The image verification apparatus 20 and the memory card 30 have the same shape and each includes a non-volatile memory capable of random access. Also, the image verification apparatus 20 and the memory card 30 can be removed from the imaging apparatus 10. However, unlike the memory card 30, the image verification apparatus 20 includes a microcomputer and has a secure function and a program execution function.

Also, the image verification apparatus 20 has a function to verify the integrity of the image data in the image file including the primary verification data generated by the imaging apparatus 10 and a function to detect whether or not the image data is changed.

Also, when the integrity of the image data in the image file including the primary verification data is confirmed, in other words, when the image data is not changed, the image verification apparatus 20 generates secondary verification data (a digital signature) for verifying the integrity and validity of the image data, and converts the image file including the primary verification data into an image file including the secondary verification data.

An example of the structure of the imaging apparatus 10 is described next. FIG. 1 is a block diagram for explaining the main structure of the imaging apparatus 10. In FIG. 1, blocks are component parts divided by functions.

A control unit 11 (for example, a central processing unit (CPU)) includes a microcomputer. An image pickup unit 14 includes an image pickup device, such as a charge-coupled device (CCD). An interface unit 13 communicates with the memory card 30 inserted in a first slot 13a. An interface unit 15 communicates with the image verification apparatus 20 inserted in a second slot 15a.

The interface unit 15 sends commands to the image verification apparatus 20, receives statuses from the image verification apparatus 20, transfers image files including primary verification data to the image verification apparatus 20, receives image files including secondary verification data from the image verification apparatus 20, and the like. A program memory 12 stores a program for controlling a function to generate the image files including the primary verification data. This program is a computer program capable of being executed by the control unit 11.

Also, the program memory 12 stores common information Kc, which corresponds to an encryption key of a common key cryptosystem, necessary for generating the primary verification data and a unique ID, such as a production number or a serial number, which is information unique to the imaging apparatus 10. The information stored in the program memory 12 is securely managed so as not to be leaked out. An operation unit 16 receives various user instructions, such as an instruction to start photographing.

Figure 2:
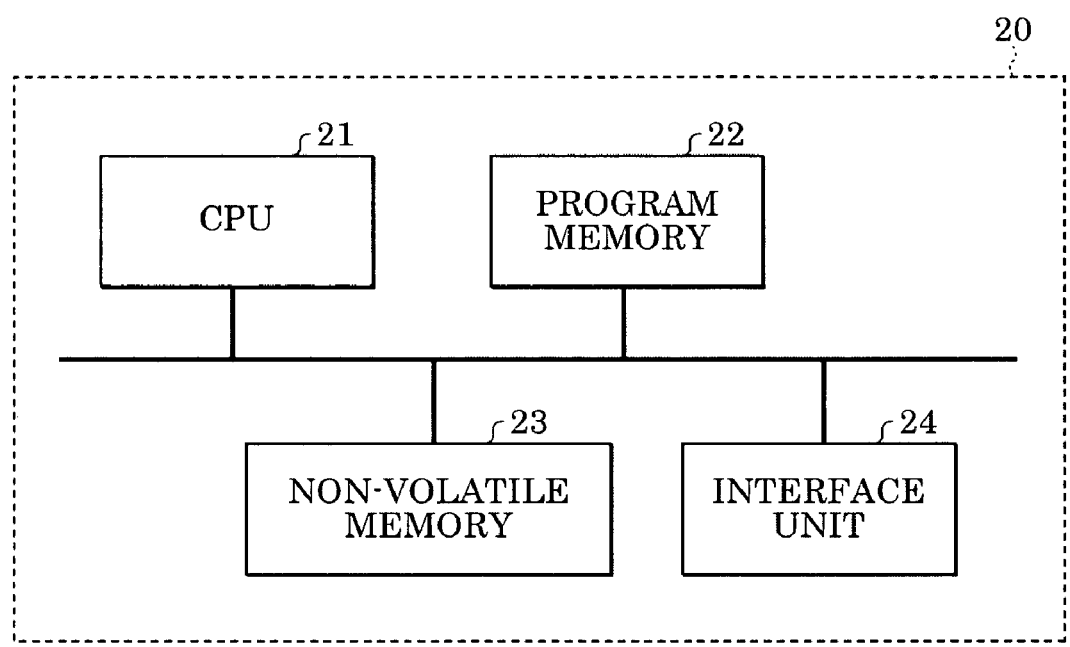
FIG. 2 is a block diagram for explaining the main structure of an image verification apparatus according to the embodiment.

An example of the structure of the image verification apparatus 20 is described next. FIG. 2 is a block diagram for explaining the main structure of the image verification apparatus 20. In FIG. 2, blocks are component parts divided by functions.

A control unit 21 (for example, a CPU) includes a microcomputer. An interface unit 24 transfers commands, statuses, and image files to the imaging apparatus 10. The interface unit 24 is connected directly to the interface unit 15 of the imaging apparatus 10 by inserting the image verification apparatus 20 into the second slot 15a of the imaging apparatus 10.

A memory 23 stores image files including primary verification data and image files including secondary verification data. The memory 23 is a non-volatile memory, such as a flash memory, capable of random access. A program memory 22 stores a program for controlling a function to verify the integrity of the image files including the primary verification data and a function to generate the image files including the secondary verification data. This program is a computer program capable of being executed by the control unit 21.

Figures 6, 7:
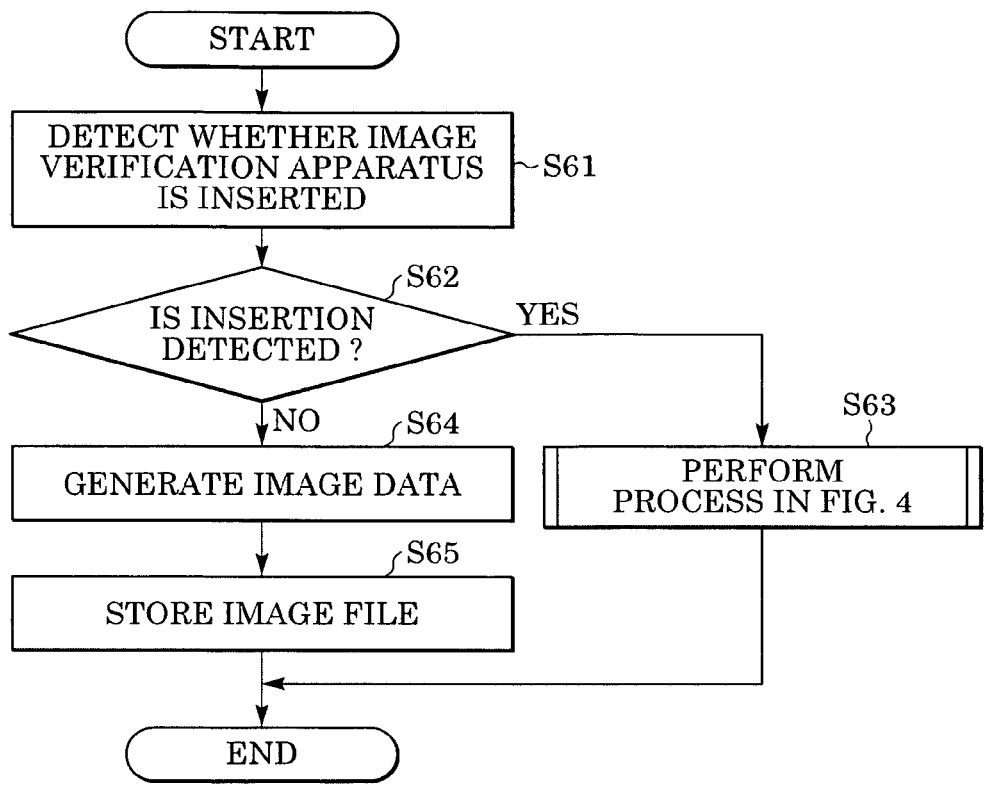
FIG. 6 is a flowchart of a process performed depending on whether or not the image verification apparatus according to the embodiment is inserted in the imaging apparatus.
FIG. 7 illustrates an example of a table in which unique IDs and secret information, which corresponds to secret keys of a public key cryptosystem, for the corresponding unique IDs are registered.

Also, the program memory 22 stores a table T1 in which unique IDs of a plurality of imaging apparatuses, common information Kc, which corresponds to decryption keys of a common key cryptosystem, for the corresponding unique IDs, and secret information Ks, which corresponds to secret keys of a public key cryptosystem, for the corresponding unique IDs are registered. FIG. 7 illustrates an example of the table T1. The information stored in the program memory 22 is securely managed so as not to be leaked out.

Figure 3:
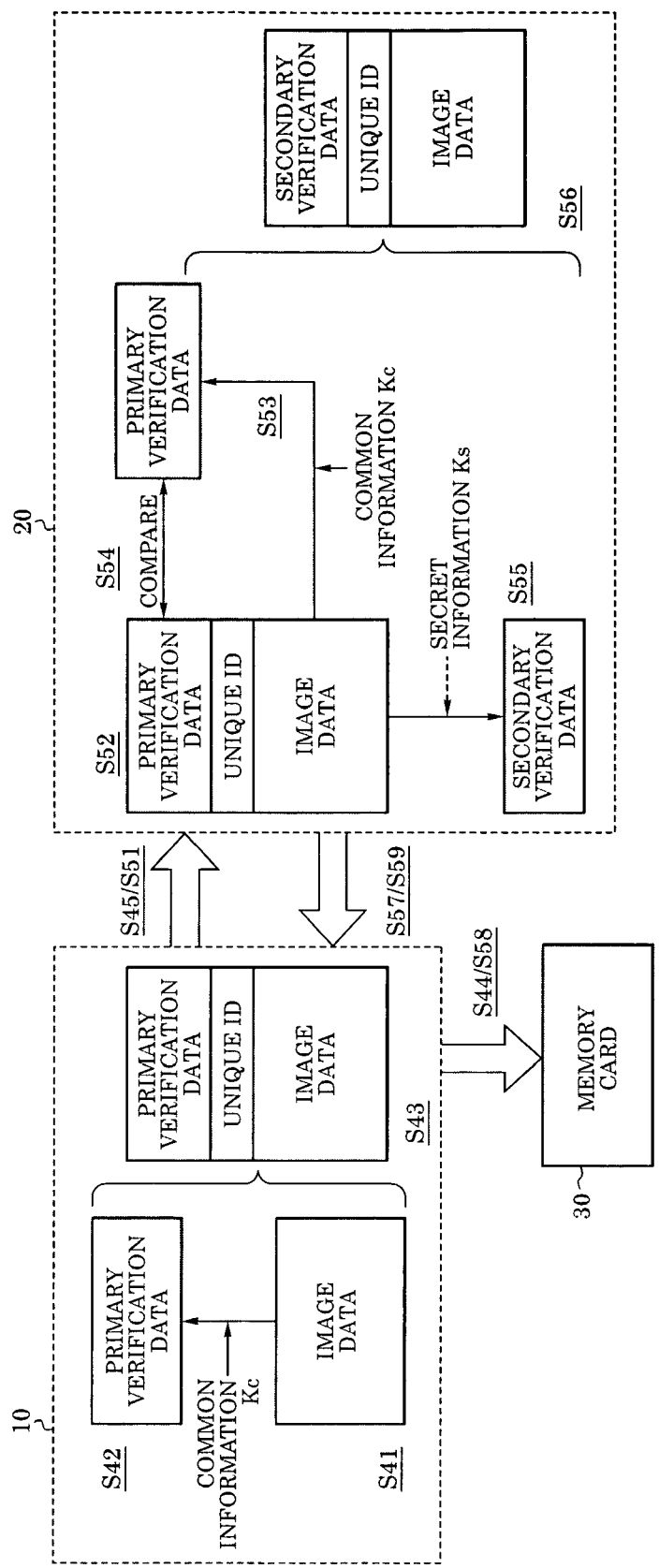
FIG. 3 is a block diagram showing a processing procedure of an image verification system according to the embodiment.

A process performed by an image verification system according to an embodiment of the present invention will now be described with reference to FIGS. 3, 4, and 5.

A process performed by the imaging apparatus 10 is described first. The process shown in FIG. 4 is performed in accordance with the program stored in the program memory 12. Also, the process shown in FIG. 4 is performed every time a piece of image data is captured.

In step S41, the image pickup unit 14 captures an object in accordance with a user instruction to generate image data. The control unit 11 converts the image data generated by the image pickup unit 14 into an image file that is in conformity with a predetermined image file format.

In step S42, the control unit 11 generates primary verification data for the generated image data in accordance with the image data and common information Kc.

In step S43, the control unit 11 adds the generated primary verification data to a header of the image file to generate an image file including the primary verification data. Also, in addition to the primary verification data, the control unit 11 adds a unique ID, such as a production number or a serial number, of the imaging apparatus 10 to the header of the image file. In this embodiment, at least one of the primary verification data and the unique ID information may be added to a footer of the image file.

In step S44, the interface unit 13 writes the image file including the primary verification data into the memory card 30 so that the image file including the primary verification data is stored in the memory card 30 that is inserted in the first slot 13a.

In step S45, the interface unit 15 transfers the image file including the first verification data to the image verification apparatus 20.

According to the process described above, every time the imaging apparatus 10 generates a piece of image data, the imaging apparatus 10 generates primary verification data for the image data. Also, the imaging apparatus 10 generates an image file including the image data, the primary verification data, and a unique ID of the imaging apparatus 10, stores the image file into the memory card 30, and transfers the image file to the image verification apparatus 20.

A process performed by the image verification apparatus 20 is described next. The process shown in FIG. 5 is performed in accordance with the program stored in the program memory 22. The process shown in FIG. 5 is performed every time an image file including primary verification data is received.

In step S51, the interface unit 24 receives an image file including primary verification data. The received image file including the primary verification data is written into the memory 23.

In step S52, the control unit 21 extracts the primary verification data from a header of the image file including the primary verification data.

In step S53, the control unit 21 extracts a unique ID of the imaging apparatus 10 from the header of the image file including the primary verification data, and extracts image data from a data part of the image file. Then, the control unit 21 refers to the table T1 stored in the program memory 22, and detects common information Kc and secret information Ks that correspond to the extracted unique ID. Then, the control unit 21 generates primary verification data for the image data in accordance with the extracted image data and the detected common information Kc.

In step S54, the primary verification data, which is generated by the imaging apparatus 10, extracted in step S52 is compared with the primary verification data, which is generated by the image verification apparatus 20, generated in step S53, so that the integrity of the image data is verified.

As a result of the comparison in step S54, if the two pieces of primary verification data are equal to each other, the process proceeds to step S55. If the two pieces of primary verification data are not equal to each other, the process proceeds to step S59.

In step S55, the control unit 21 generates secondary verification data (a digital signature) in accordance with the image data in the image file including the primary verification data.

In step S56, the control unit 21 replaces the primary verification data arranged in the header of the image file with the secondary verification data generated by the control unit 21 in order to generate an image file including the secondary verification data. The generated image file including the secondary verification data is written into the memory 23.

In step S57, the interface unit 24 transfers the image file including the secondary verification data generated by the control unit 21 to the imaging apparatus 10. Here, the control unit 21 may delete or may be in a state to delete the image file including the primary verification data and the image file including the secondary verification data stored in the memory 23.

In step S58, the imaging apparatus 10 writes the image file including the secondary verification data into the memory card 30 so that the image file including the secondary verification data transferred from the image verification apparatus 20 is stored in the memory card 30.

As a result of the comparison in step S54, if the process proceeds to step S59, the control unit 21 determines that a data change occurs, and reports to the imaging apparatus 10 that the image data is changed. The imaging apparatus 10 sends a message indicating that the image data is changed to a user. In this case, the control unit 21 inhibits the generation of secondary verification data.

As described above, the image verification apparatus 20 is capable of accurately detecting whether or not image data generated by the imaging apparatus 10 is changed without requiring a significantly increased performance of an operation resource of the imaging apparatus 10 and without requiring a large-scale configuration of the imaging apparatus 10.

In accordance with a result of the detection, the image verification apparatus 20 is capable of accurately determining whether or not image data in an image file including primary verification data is generated by the imaging apparatus 10. Also, if the integrity of the image file including the primary verification data is confirmed, the image verification apparatus 20 is capable of converting the image file including the primary verification data into an image file including secondary verification data (an image file including a digital signature).

A process performed depending on whether or not the image verification apparatus 20 is inserted in the second slot 15a of the imaging apparatus 10 will now be described with reference to a flowchart shown in FIG. 6. In this process, first verification data is generated if the image verification apparatus 20 is inserted in the second slot 15a of the imaging apparatus 10, and the first verification data is not generated if the image verification apparatus 20 is not inserted in the second slot 15a of the imaging apparatus 10.

In step S61, the imaging apparatus 10 detects whether or not the image verification apparatus 20 is inserted in the second slot 15a. Various procedures are possible to detect an installation state of the image verification apparatus 20. For example, the installation state of the image verification apparatus 20 may be detected using a detection switch or the like. Alternatively, it may be determined whether or not a response is sent from the image verification apparatus 20 to the imaging apparatus 10 in response to a command sent from the imaging apparatus 10 to the image verification apparatus 20.

Then, in step S62, a result of the detection in step S61 is determined. As a result of the determination, if insertion of the image verification apparatus 20 is detected, the process proceeds to step S63. If insertion of the image verification apparatus 20 is not detected, the process proceeds to step S64.

Figure 4:
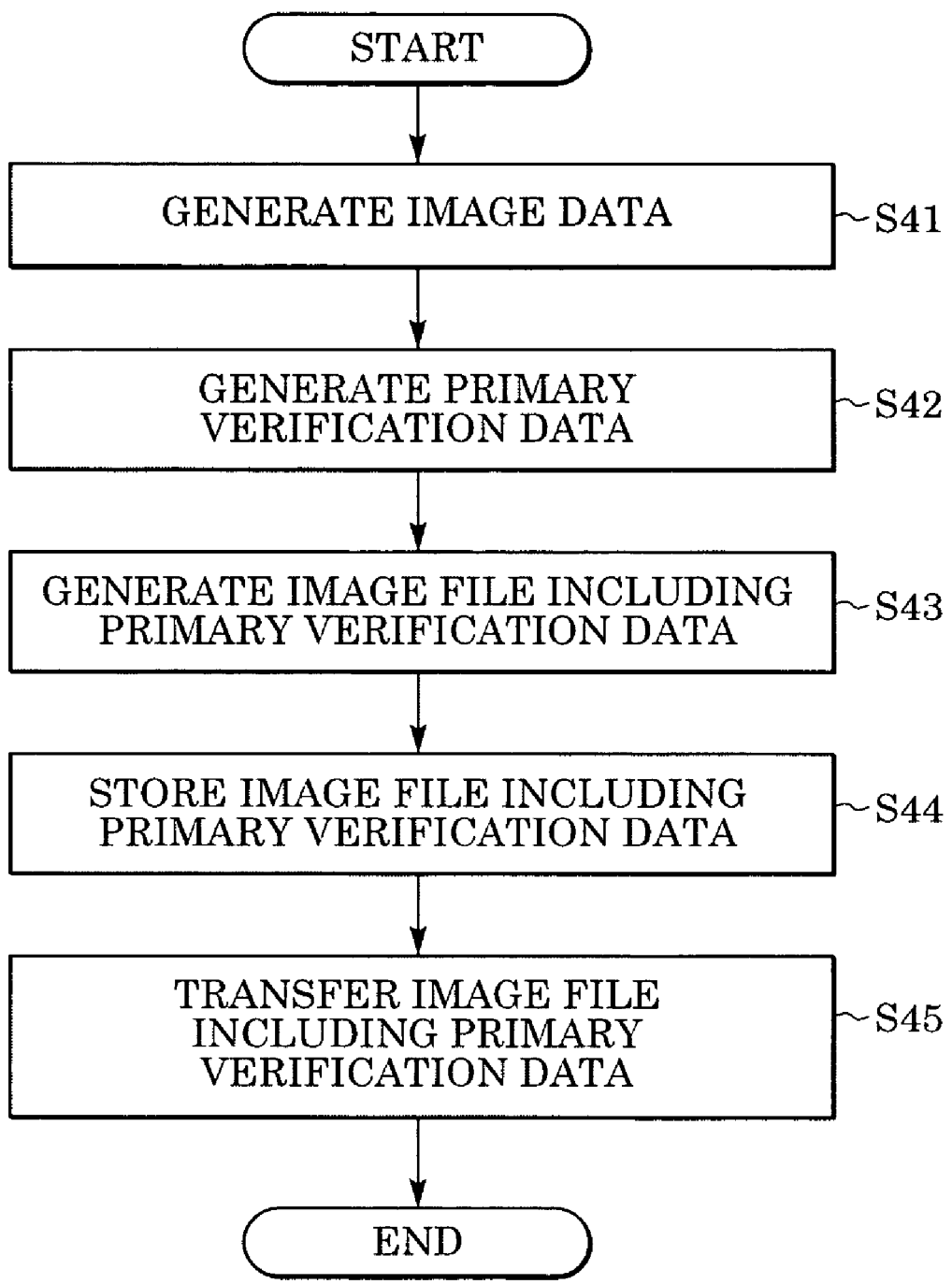
FIG. 4 is a flowchart of a process performed by the imaging apparatus of the image verification system according to the embodiment.
Figure 5:
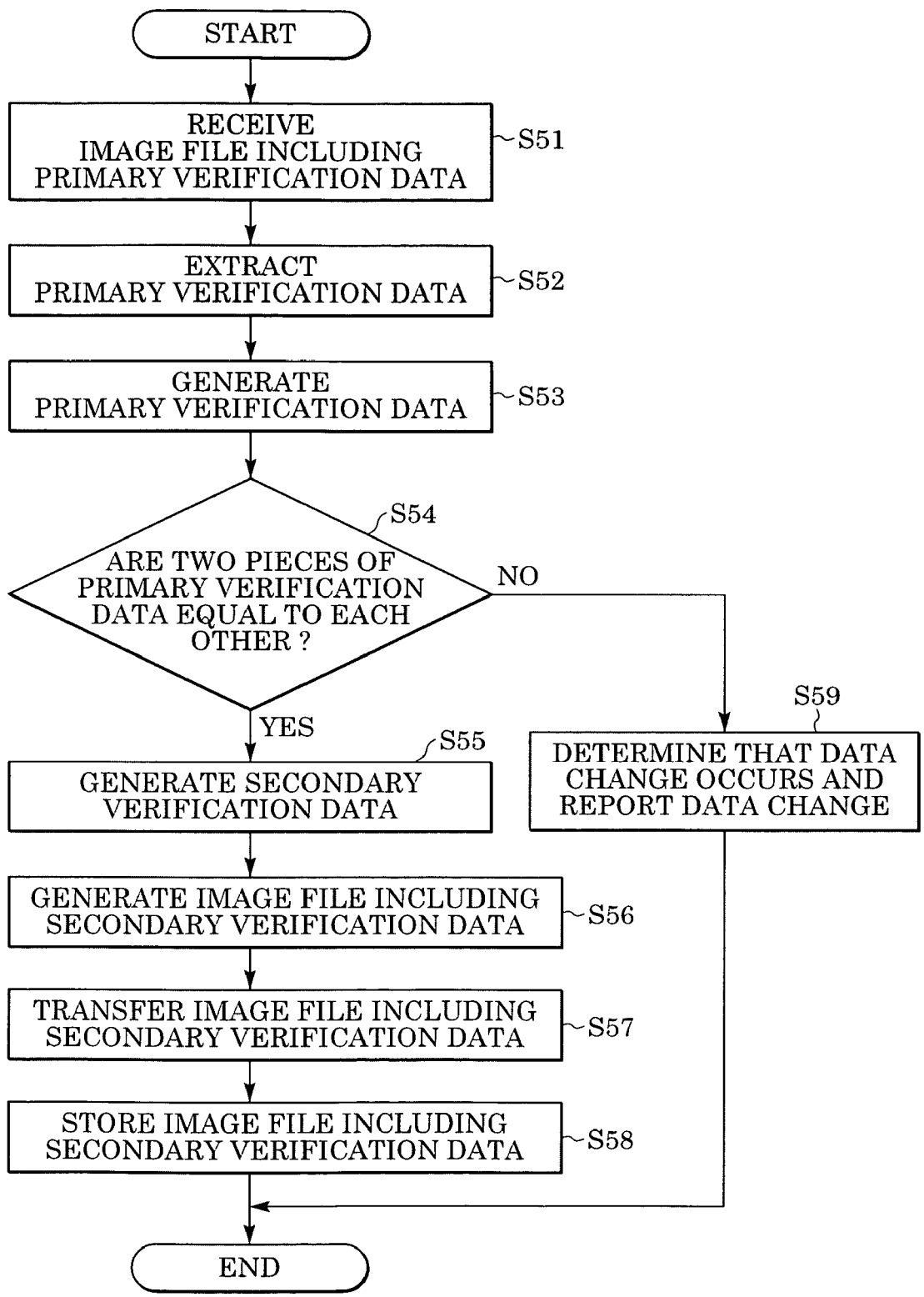
FIG. 5 is a flowchart of a process performed by the image verification apparatus of the image verification system according to the embodiment.

In step S63, the imaging apparatus 10 performs processing as in the flowchart shown in FIG. 4.

If the process proceeds to step S64, the imaging apparatus 10 generates image data and an image file. However, in step S64, the imaging apparatus 10 does not generate primary verification data.

In step S65, the imaging apparatus 10 stores the image file generated in step S64 into the memory card 30.

Modifications

Also, supplying program code of software for realizing the functions of the foregoing embodiments to a computer (central processing unit (CPU) or a micro-processing unit (MPU)) in an apparatus or a system connected to various devices for operating the various devices so as to realize the functions of the foregoing embodiments and operating the various devices in accordance with a program stored in the computer of the apparatus or the system is also included in the scope of the present invention.

In this case, the program code itself of the software realizes the functions of the foregoing embodiments. The program code itself and means for supplying the program code to the computer, for example, a recording medium storing the program code, constitute the present invention. The recording medium for recording the program code may be, for example, a flexible disk, a hard disk, an optical disk, a magnetic optical disk, a compact disk read-only memory (CD-ROM), a magnetic tape, a nonvolatile memory card, a ROM, and the like.

The program code is included in the embodiments of the present invention not only when the functions of the foregoing embodiments are realized by executing the supplied program code by the computer but also when the functions of the foregoing embodiments are realized by the program code in cooperation with an operating system (OS) or other application software running on the computer.

Furthermore, after the supplied program code is stored in a function expansion board inserted into the computer or to a memory provided in a function expansion unit connected to the computer, a CPU or the like mounted on the function expansion board or function expansion unit performs all or a part of the actual processing in accordance with instructions of the program code so that the functions of the foregoing embodiments can be implemented by this processing.

The above-described preferred embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2003-435127 filed Dec. 26, 2003 and Japanese Patent Application No. 2004-357314 filed Dec. 9, 2004, which are hereby incorporated by reference herein.

What is claimed is:

1. A digital camera, comprising:

an image data generating unit that generates image data;

a verification data generating unit that generates first verification data used to detect whether the image data is changed;

a first slot in which a recording medium is inserted;

a second slot in which an image verification apparatus is inserted;

a first interface unit that stores a first image file in the recording medium inserted in the first slot, wherein the first image file includes the image data and the first verification data; and a second interface unit that transfers the first image file to the image verification apparatus inserted in the second slot, wherein the image verification apparatus inserted in the second slot is capable of detecting, using the image data and the first verification data, whether the image data is changed, wherein the image verification apparatus inserted in the second slot (a) generates second verification data used to detect whether the image data is changed if the image verification apparatus inserted in the second slot detects that the image data is not changed, (b) generates a second image file including the image data and the second verification data, and (c) transfers the second image file to only the digital camera after the image verification apparatus inserted in the second slot generates the second image file, wherein the second interface unit receives the second image file transferred from the image verification apparatus inserted in the second slot, and the first interface unit stores the second image file received by the second interface unit in the recording medium inserted in the first slot.

2. A digital camera according to claim 1, wherein the verification data generating unit generates the first verification data using the image data and information corresponding to an encryption key of a common key cryptosystem.

3. A digital camera according to claim 1, wherein the image verification apparatus inserted in the second slot does not generate the second verification data if the image verification apparatus detects that the image data is changed.

4. A digital camera according to claim 1, wherein the digital camera does not generate the first verification data if the image verification apparatus is not inserted in the second slot.

5. A digital camera according to claim 1, wherein the second verification data is a digital signature.

6. A digital camera according to claim 1, wherein the image verification apparatus and the recording medium have the same shape.

* * * * *